United States Patent [19]

O'Connell

[11] Patent Number: 4,766,450

[45] Date of Patent: Aug. 23, 1988

[54] CHARGING DEPOSITION CONTROL IN ELECTROGRAPHIC THIN FILM WRITTING HEAD

[75] Inventor: Patrick A. O'Connell, Fremont, Calif.

[73] Assignee: Xerox Corporation, Stamford, Conn.

[21] Appl. No.: 74,644

[22] Filed: Jul. 17, 1987

[51] Int. Cl.[4] .......... G01D 15/00

[52] U.S. Cl. .......... 346/155; 346/153.1

[58] Field of Search .......... 346/155, 139 C, 162, 346/163, 153.1; 400/114; 101/DIG. 13; 358/300

[56] References Cited

U.S. PATENT DOCUMENTS

| | | | |
|---|---|---|---|
| 3,922,708 | 11/1975 | Crowder et al. | 357/51 |
| 4,030,107 | 6/1977 | Tagawa | 346/155 |
| 4,161,431 | 7/1979 | Matsunaga et al. | 204/15 |
| 4,356,501 | 10/1982 | Ronen | 346/155 |
| 4,359,753 | 11/1982 | Marshall | 346/153.1 |
| 4,415,403 | 11/1983 | Bakewell | 156/634 |
| 4,466,020 | 8/1984 | O'Connell | 358/293 |
| 4,510,178 | 4/1985 | Paulson et al. | 427/94 |
| 4,588,997 | 5/1986 | Taun et al. | 346/76 PH |

FOREIGN PATENT DOCUMENTS

| | | | |
|---|---|---|---|
| 53-69617 | 1/1979 | Japan | 346/155 |
| 611173 | 5/1978 | U.S.S.R. | 346/155 |

*Primary Examiner*—Arthur G. Evans
*Attorney, Agent, or Firm*—W. Douglas Carothers, Jr.

[57] ABSTRACT

An improved electrographic writing head having electrode nibs for forming discrete electrostatic charges on a recording medium moved in a plane in contact with the nib ends in the head wherein the improvement comprises the employment of an impedance formed in the electrode nibs at or in proximity to the nib ends to reduce the intercoupling capacitance effect between adjacently disposed nibs to prevent flaring from occurring on the deposition of charge from the nib ends. The impedance is in the range of several megohms, such as, 50–1000 megohms.

5 Claims, 3 Drawing Sheets

CHARGING DEPOSITION CONTROL IN ELECTROGRAPHIC THIN FILM WRITTING HEAD

BACKGROUND OF THE INVENTION

This invention relates to thin film high voltage electrographic writing heads for recording information on a recording medium and, in particular, to improvements in the control of the phenomenon known as "flare" or "flaring" that occurs upon electrode discharge in electrographic writing processes.

It is known in the electrographic writing head art to employ for electrographic writing a plurality of spatially disposed conductive electrode lines deposited on an insulating substrate which terminate in a nib or stylus. The nibs may be of any metal suitably formed using for photolithographic and electroforming techniques such as copper, nickel or tungsten, or may be polysilicon formed on a silicon or ceramic substrate. Examples of such electrographic writing head structures are disclosed in U.S. Pat. Nos. 4,356,501 and 4,415,403. These thin film electrographic writing head structures also have included driving logic and circuitry integrally fabricated upon the same head substrate, such as the multiplexed driving circuit, high voltage and low voltage thin film transistors and accompanying address and data bus lines. Low voltage address lines operate to selectively address nibs or groups of nibs for discharging by applying a high voltage to the stylus via its connected high voltage thin film transistor. Such an arrangement is shown in U.S. Pat. No. 4,588,997. Pulse forming circuit arrangements may include a R-C network between a voltage source and the nibs for the purpose of providing a lower address voltages to the nibs and facilitating the supply of voltage to the nibs to cause a sufficient discharge for latent image writing. Examples of such networks are shown in U.S. Pat. Nos. 4,030,107, 4,359,753 and 4,466,020.

One of the problems encountered in this technology is that the discharge from the nibs is not always uniform so that the latent image spots created on the recording medium nonuniform in shape and enlarged or irregular in size compared to other latent image spots. This phenomenon is known in the art as "fare" or "flaring". Flare is detrimental to the quality of printed or plotted images on the recording medium because the spot sizes formed on the recording medium on discharge of the nibs are not uniform and flare out in an irregular pattern. Also, arcing across nibs to the recording medium further causes such enlargement and destructive disfiguration of the uniformity of spot size. To prevent flaring from occurring, limiting resistors have been placed in the driving logic or in the electrode lead lines leading to the nibs to limit the flow of current to the nibs and prevent such arcing and spot size irregularity. Examples of resistance that particularly function in this manner are disclosed in Russian patent publication No. 611,173 and U.S. Pat. No. 4,415,403, which respectively illustrate limiting resistors 3 and 82 in electrode lead lines to stylus or nib 1 and 88.

However, the problem of flaring still prevails in the art in spite of the utilization of such limiting resistors. Flaring still occurs and spot sizes, while being more uniform in size, still remain with ragged edges and nonuniform size.

SUMMARY OF THE INVENTION

According to this invention, flaring can be substantially eliminated or significantly reduced, forming uniform latent image spots by providing resistance in the nibs per se or in an area in the nibs close to the nib ends. Flaring is caused by an excessive form of discharge due to the energy stored by the capacitance that inherently exists between spatially adjacent nibs. Upon discharge of an adjacent nib, the energy stored in this capacitance is also discharged resulting in an arc discharge which is uncontrolled by any impedance intended for current limiting as taught in the prior art. By incorporating impedance at or adjacent to the nib end, current limiting is imposed upon the inherent capacitance between adjacent nibs to eliminate or substantially reduce the ability of an associated nib to flare thereby improve the writing quality of the electrographic writing head.

Another advantage achieved by the use of impedance at the nib is that in the event of an electrical short circuit between neighboring nibs or an inadvertent connection of nibs of significantly different potential, the resulting flow of current therebetween will be sufficiently small so that no damage will occur to the electrode structure or their driving logic which damage would be catastrophic preventing further use of the electrographic writing head.

DETAILED DESCRIPTION OF THE PREFERRED EMBODIMENTS

Figure 1:
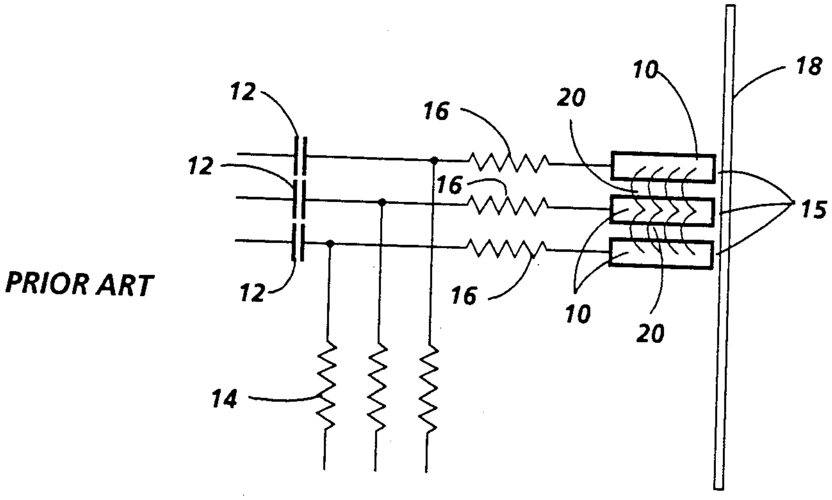
FIG. 1 is a schematic illustration of the circuit arrangement known in the prior art.

Reference is now made to FIG. 1 wherein there is shown a typical circuit arrangement to the electrode nibs of an electrographic writing head exclusive of voltage sources and drivers. Only three nibs and their accompanying circuit arrangement are shown for purposes of simplicity, as there are several hundreds of nibs across the head. The circuit arrangement for each nib 10 in the head comprises a pulse forming circuit containing a capacitor 12 and a load resistor or impedance 14 connected together to nib 10. Impedance 14 is required generally due to the large capacitance value of capacitor 12. The R-C time constant of this arrangement is selected to provide a sufficiently quick response time and duration to conclude with a pulse that will provide Paschen voltage breakdown in the gap 15 between the end of nib 10 and recording medium 18 resulting in a discharge and deposition of a writing spot on the surface of the recording medium. Limiting resistor 16 is included for current limiting to prevent arcing resulting in enlargement and nonuniform alteration of the writing spot. This type of arrangement is generally shown, for example, in U.S. Pat. Nos. 4,359,753 and 4,415,403, supra.

In spite of the use of limiting resistors 16, the problem of flaring persists so that it is clear that the use per se of such resistors 16 in the lead line to the nibs is not sufficient to prevent flaring to a degree that writing resolution is improved to an acceptable level.

The solution to the problem is by, first, proper isolation and identification of the source of the problem. Examination of the electrical characteristics of the writing head electrode geometry indicates that, due to the very close spacing of the nibs 10, the intercoupling capacitance 20 therebetween is quite large, for example, on the order of 1 to 5 pf. This capacitance is sufficiently large and representative of an energy store near the point of electrode or nib discharge to provide additional energy on nib discharge. Since the capacitance is in line between nibs 10, the discharge geometry resulting on recording medium 18 will be materially effected and will have flares extending toward adjacent nibs 10. As a result, an irregular shaped writing spot will be formed in spite of the presence of limiting resistor 16.

Figure 2:
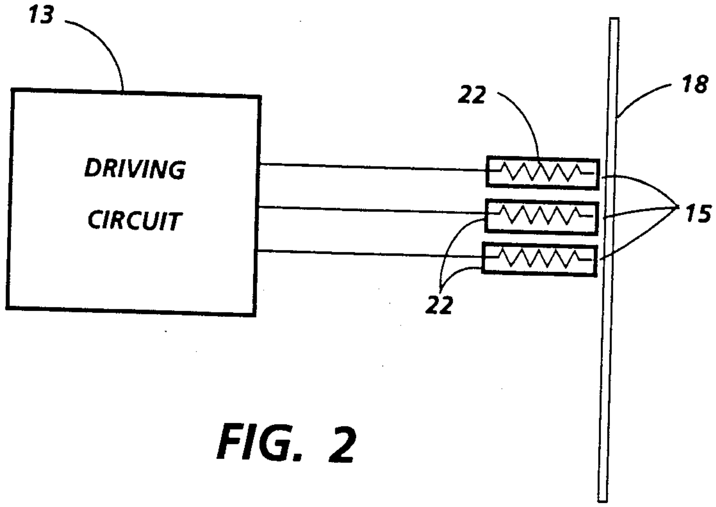
FIG. 2 is a schematic illustration of the circuit arrangement comprising this invention.

This flaring can be substantially eliminated by employing an impedance, such as resistance 22, in nib 10, as illustrated in FIG. 2, preferably either close to the writing end of the nib 10 or at the writing end of nib 10. Resistor 22 represents local impedance at or in proximity to the source of discharge and charge deposition so that the effect of stored energy in the form of intercoupling capacitance 20 between nibs is very small and, therefore, is effectively eliminated and, as a result, is effective in substantially eliminating conventional nib flare. Experiments have shown that the value of resistor 22 is chosen to be several megohms, typically between 50–1000 megohms, although this value may be even larger. This value, however, cannot be made too large as the discharge speed of adjacent nibs will be effected due to a large RC time constant between adjacent nibs. In other words, the time response of a nib will be effected by the RC time constant with neighboring nibs. Also, the interelectrode capacitance between nibs along the full length of the electrodes up to driving circuit 13 has been measured and found to be on the order of 0.1 pf.

In FIG. 2, driving circuit 13 may comprise any circuitry known in the the art for driving nibs 10 including the capacitor/resistor network in FIG. 1. Such known circuits include thin film semiconductor drivers, resistor network, capacitor network, semiconductor integrated circuit, discrete nib drivers or commutator divers.

The principal concept in reducing the formation of flare is to reduce the amount of energy stored at nibs 10 due to the existing intercoupling capacitance 20. This capacitance functions as a store of energy that provides the energy to increase the extent of flaring on discharge. By reducing this energy store, a large energy dump cannot occur, which would be productive of flaring.

Figure 3:
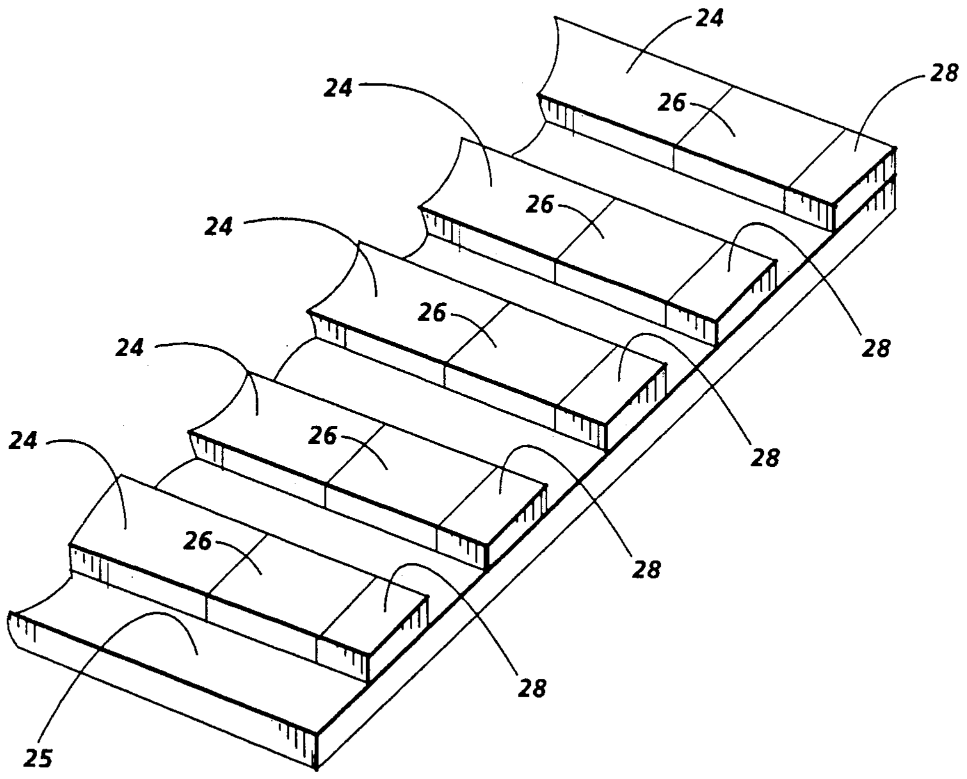
FIG. 3 is a perspective view of an embodiment of a nib structure for an electrographic writing head of this invention.
Figure 4:
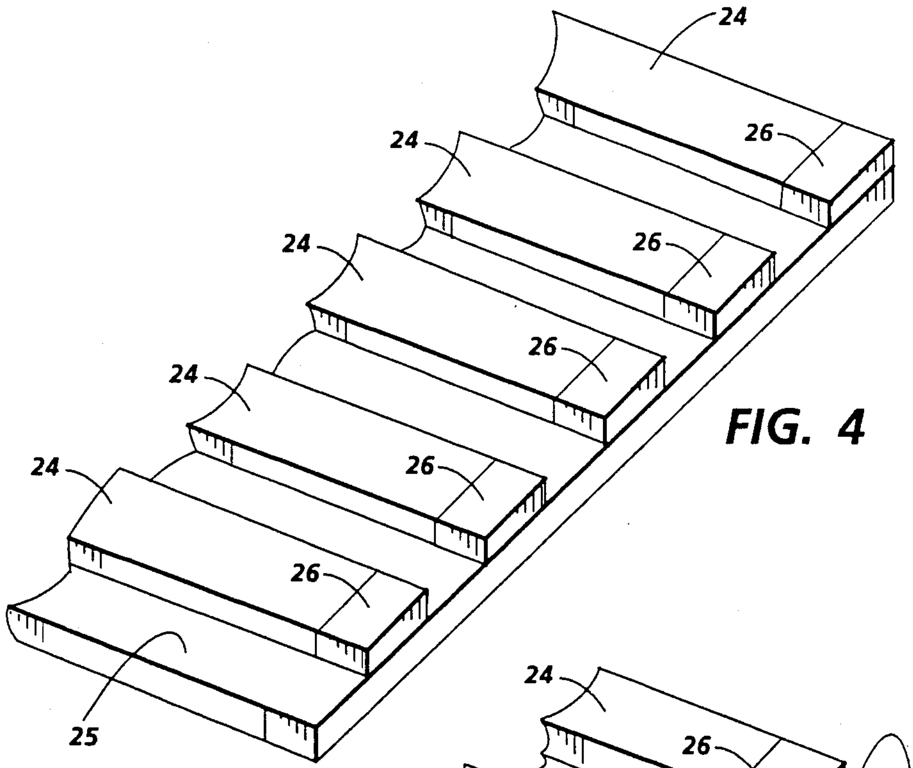
FIG. 4 is a perspective view of another embodiment of a nib structure for an electrographic writing head of this invention.
Figure 5:
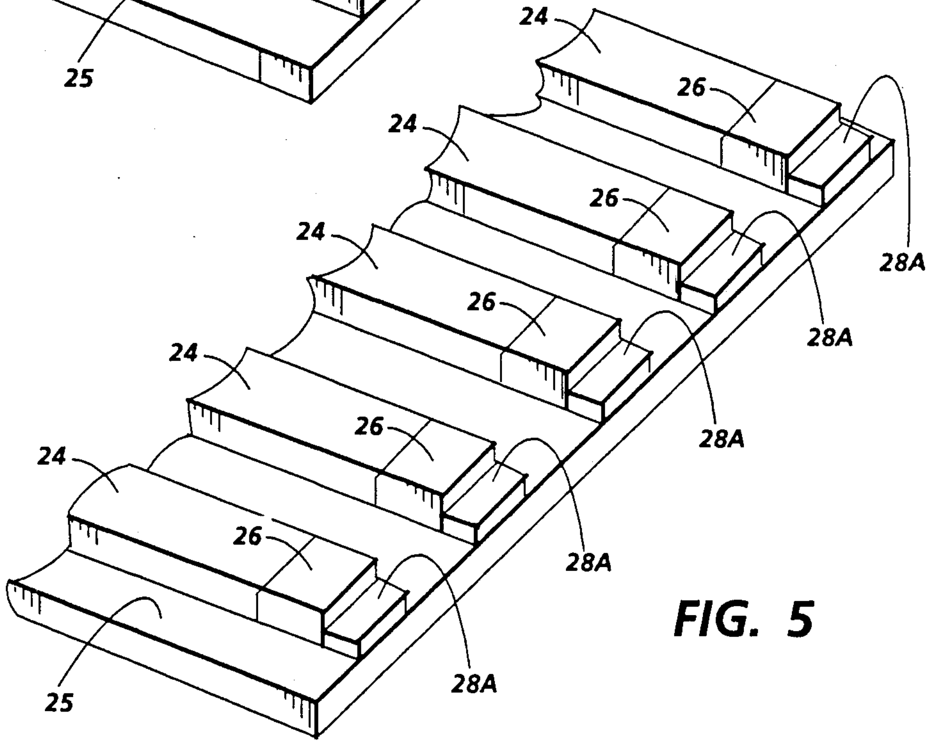
FIG. 5 is a perspective view of still another embodiment of a nib structure for an electrographic writing head of this invention.

FIGS. 3–5 relate to particular geometries for inclusion of resistance 22 in nib 10 or close to the end of nib 10. In each of these three enlarged figures, only the nib 24 is shown exclusive of their lead lines as patterned on support 25, e.g. a fiberglass substrate. Nibs 24 may be, for example, about 1 μm thick and comprised of a strip of Al on a very thin Cr layer for substrate adhesion. The Cr layer may be, for example, twenty times thinner than the Al layer. Resistance 26 may be comprised of n+ amorphous silicon. Resistance 26 may also be an oxide of Al, Ni or Co. In FIG. 3, resistance 26 in each nib 24 is positioned adjacent to the writing end 28. However, resistance 26 is proportionately very close to the end of each nib 24. In FIG. 4, resistance 26 is positioned at the writing end of each of the nibs 24. In FIG. 5, resistance 26 in each nib 24 is positioned adjacent to the nib writing end 28A, as in the case of FIG. 3. However, in this embodiment, the nib writing ends 28A are thinner to further educe the intercoupling capacitance at this point 20 between adjacent nibs 24. With the combination of nib resistance 26 and thin sheet writing nibs 28A, the intercoupling capacitance is substantially eliminated due to reduced cross sectional area of the nib at this point.

In the preferred embodiment, it has been found that the nib writing end 28 may be about 1 μm thick and about 17 mils long to provide a sufficiently long wear length. The range of thicknesses for nib 28 or 28A (or resistance nib 26 in the case of FIG. 4) may be about 0.5 μm to 5 μm. In the FIG. 5 embodiment, the thickness of nib writing end 28A may be, for example, 0.5 μm.

The lower limit of nib thickness is governed by catastrophic damage to the nib end due to disintegration upon application of a high voltage and subsequent discharge, unless it is possible to reduce the energy delivered to the nib and still obtain a suitable write discharge. However, there is a limit to how far the voltage can be reduced and still obtain a suitable write discharge. Further, a nib that is too thin will not have sufficient mechanical contact with the recording medium.

The upper limit of nib write end thickness is governed by a thickness that is too large providing too much capacitance and defeating the purposes sought after in this invention.

In summary, the intercoupling capacitance between writing nibs in an electrographic head can be effectively eliminated to significantly reduce nib flaring by placing resistance at the nib writing tip or adjacent to the nib writing tip. The effectiveness can be further enhanced by reducing the thickness of the nib writing end.

While the invention has been described in conjunction with a few specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. In an improved electrographic writing head for forming discrete electrostatic charges on a recording medium moved in a plane relative to said head comprising a substrate, a plurality of spatially disposed electrode lines formed on said substrate, writing nibs formed at the ends of said electrode lines having their writing tips lying along an edge of said substrate, the improvement comprising an impedance formed in said nibs at said writings or adjacent to said writing tips to reduce the intercoupling capacitance effect between adjacently disposed nibs so as to aid in the prevention of flaring on the deposition of charge friom said writing tips onto said recording medium.

2. In the improved electrographic writing head of claim 1 wherein said impedance is several megohms.

3. In the improved electrographic writing head of claim 2 wherein said impedance is in the range of 50–1000 megohms.

4. In the improved electrographic writing head of claim 1 wherein said writing tip is about 1 μm thick.

5. In the improved electrographic writing head of claim 1 wherein said impedance comprise n+ amorphous silicon.

* * * * *